United States Patent
Sakaguchi et al.

(10) Patent No.: US 6,526,388 B1
(45) Date of Patent: Feb. 25, 2003

(54) INTEROPERABLE WORKFLOW MANAGEMENT SYSTEM

(75) Inventors: Toshiaki Sakaguchi, Takatsuki (JP); Shunsuke Akifuji, Wako (JP); Hiroshi Tsuji, Itami (JP); Michiaki Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/080,720

(22) Filed: May 19, 1998

(30) Foreign Application Priority Data

May 21, 1997 (JP) .............................. 9-131298

(51) Int. Cl.$^7$ .............................................. G06F 17/60
(52) U.S. Cl. ............................... 705/8; 705/9; 707/500; 709/225
(58) Field of Search ........................... 705/8, 9, 50, 51; 707/500; 713/200, 201, 380; 710/200; 709/225

(56) References Cited

U.S. PATENT DOCUMENTS

| | | | |
|---|---|---|---|
| 5,581,691 A | * 12/1996 | Hsu et al. | 714/15 |
| 5,623,653 A | * 4/1997 | Matsuno et al. | 707/200 |
| 5,826,239 A | * 10/1998 | Du et al. | 705/8 |
| 5,867,824 A | * 2/1999 | Saito et al. | 705/9 |
| 6,004,276 A | * 12/1999 | Wright et al. | 600/508 |
| 6,237,099 B1 | * 5/2001 | Kurokawa | 713/200 |
| 6,253,217 B1 | * 6/2001 | Dourish et al. | 707/500 |

FOREIGN PATENT DOCUMENTS

| | | | |
|---|---|---|---|
| EP | 0 272 561 | 6/1988 | |
| EP | 10 326314 | 12/1998 | |
| EP | 880102 A2 | * 2/1999 | G06F/13/00 |
| JP | 6-266633 | 9/1994 | |
| JP | 7-226768 | 8/1995 | |
| JP | 8-255135 | 10/1996 | |

OTHER PUBLICATIONS

"Nikkei Computer", May 1994, pp. 57–67.
Transactin of Information Processing Society of Japan, 6–179.
Interoperability–Abstract Specification, Document No. WFMC–TC–1012, Oct. 20, 1996, Workflow Management Coalition, published by WFMC.
"Interoperability–Internet e–mail MIME Binding", Document No. WFMC–TC–1018, Oct. 20, 1996, published by WFMC.
Riempp et al, "Workflow Management betwen distributed organizations—the Wide Area GroupFlow Approach," Proceedings of the German Computer Supported Cooperative Work, Online 1996, pp. 275–292, XP002124470, Berlin/Heidelberg, DE Retrieved from the Internet Dec. 1, 1999.
Mandviwalla et al, "Teambox: An Exploration of Collaborative Interoperatility," Conference on Organizational Computing Systems, Aug. 18, 1995, pp. 347–353, XP000620971, New York, NY.

(List continued on next page.)

*Primary Examiner*—Tariq R. Hafiz
*Assistant Examiner*—D. Robertson
(74) *Attorney, Agent, or Firm*—Mattingly, Stanger & Malur, P.C.

(57) ABSTRACT

An interoperable workflow management system controls an information disclosing range of a workflow case to prevent transmission delay even when the communication path has a small transmission capacity such that cancellation of the case is guaranteed and the status of processing of the case in its destination can be immediately known. To implement the system, workflow irrelevant data or pointer information indicating the data is selectively transmitted to the destination in accordance with the workflow management system thereof. At cancellation of the case, the irrelevant data is replaced with canceling data. When a request including pointer information for the workflow irrelevant data is received from the destination system, it is assumed that the workflow case is in process.

5 Claims, 6 Drawing Sheets

OTHER PUBLICATIONS

"Workflow Management Coalition—Workflow Security Considerations—White Paper, Document No. WFMC–TC–1019," The Workflow Management Coalition Specification, Online Feb. 1998 (1988–02), XP002124399, Winchester, Hants, GB. Retrieved from the Internet Nov. 30, 1999.

Hollingsworth, D, 'Workflow Management Coalition The Workflow Reference Model', doc. No. TC00–1003, Jan. 19, 1995, Winchester Hampshire, UK. The Workflow Management Coalition.*

'Interworkflow Application Model: The Design of Cross–Organizational Workflow Processes and Distributed Operations Management', Workflow Management Coalition, doc.No. WFMC–TC–2102, Feb. 1997.*

Hura, G.S., 'Client Server Computing Architecture: An Efficient Paradigm for Project Management', Singapore, Engineering Management Conference, p. 146–152, Mar. 1995, Retrieved from: IEEE.*

Ames, C.K., 'WWWorkflow: World Wide Web based Workflow', Burleigh, S.C., Mitchell, S.J.; Jet Propulsion Laboratory, p. 397–404, 1997, Retrieved from: IEEE.*

Gunthor, R., 'The Dependency Manager: a base service for transactional workflow management', IBM Eur. Networking Ctr, Germany, Feb. 26, 1996, p. 86–95, IEEE cat. No.96TB100021, access No. 5250276.*

Marshak, R.T., 'IBM FlowMark 2.2: Expanding the Capabilities of Object–Oriented Workflow', Workgroup Computing Report, v19, n7, 1996.*

Du, W. 'Flexible Specification of Workflow Compensation Scopes', Davis, J., Shan, M, HP Laboratories, Conference on Supporting Grp Work, Nov. 16, 1997, p. 309–316, Retrieved from: ACM.*

Alonso, G. 'Distributed Data Management in Workflow Environments', Inst. of Inf. Syst., Eidgenossische Tech, Switzerland, p. 82–90, Apr. 7, 1997, IEEE cat No.: 97TB100122. Access No. 5546206.*

Reichert, M. 'A framework for dynamic changes in workflow management systems', Database and Expert Systems Applications, Sep. 1, 1997, p. 42–48, IEEE cat No. 97TB100181, access No. 5710302.*

Ackroff, J. 'Automating the Special Service Work Flow', AT&T Bell Laboratories, 1989, Retrieved from: IEEE.*

Miller, J.A., 'Simulation Modeling within Workflow Technology', Winter Simulation Conference, Arlington, VA, USA, Dec. 3, 1995, p. 612–619, Retrieved from: ACM.*

Pinci, V.O., 'Workflow Analysis', Shapiro, R.M.; Meta Software Corporation, Cambridge, MA, USA, p. 1122–1130, Proceedings of the 1993 Winter Simulation Conference.*

'Workflow Management Coalition: Workflow Standard—Interoperability Abstract Specification', doc. No. WFMC–TC–1012, Oct. 20, 1996, Belgium. The Workflow Management Coalition.*

* cited by examiner

FIG.2

116 ASSOCIATED DESTINATION INFORMATION TABLE

| ASSOCIATED DESTINATION ID (172) | ADDRESS (174) | DISCLOSURE LEVEL (176) |
|---|---|---|
| osaka@hitachi | osaka@hitachi | WITHIN FIRM |
| tokyo@hitachi | tokyo@hitachi | WITHIN FIRM |
| kanren@hit_works | kanren@hit_works | RELATED FIRM |
| sonota@abc-sales | sonota@abc-sales | RELATED FIRM |
| | | |
| | | |

INTEROPERABLE WORKFLOW MANAGEMENT SYSTEM

BACKGROUND OF THE INVENTION

The present invention relates to an interoperable workflow management system, and in particular, to an interoperable workflow management system in which a plurality of workflow management systems associatively process workflow cases via a network.

A workflow management system is a system to manage a workflow, i.e., a business process and includes three elements: workflow definition, workflow execution, and workflow audit trail.

In the workflow definition, a workflow case and its workflow or circulating destination are defined.

In the workflow execution, the workflow case is circulated in accordance with the workflow definition.

In the workflow audit trail, a status of workflow or circulation is recognized and a workflow thereof is analyzed.

Japanese periodical "Nikkei Computer" (Nikkei BP, May 1994; pp. 57–67) describes an example of the workflow management system.

Furthermore, "Transaction of Information Processing Society of Japan 6-179 (first half term 1995) describes an environment (a multi-server environment) in which a plurality of workflow management systems associatively process workflow cases.

Additionally, the JP-A-8-255135 describes an example in which a plurality of workflow management systems interchange workflow cases via electronic mail.

Moreover, "Interoperability—Abstract Specification (document No. WFMC-TC-1012, Oct. 20, 1996) of Workflow Management Coalition (WfMC; Brussels, Belgium) stipulates control attributes and other items for associative operations of a plurality of workflow management systems.

In addition, "Interoperability—Internet e-mail MIME Binding" (document No. WFMC-TC-1018, Oct. 20, 1996) published from WfMC stipulates a method in which information for operations such as transmission of a workflow case, detection of a status of the transmitted workflow case, and cancellation of the case is transmitted by electronic mail to thereby achieve the operations above.

The prior art is associated with the following problems to be solved.

(1) Information disclosure cannot be controlled.

When workflow management systems are associatively operated between different firms and groups or organizations, information disclosed to external firms or organizations is desirably limited when compared with information internally disclosed within the respective firms or organizations. However, in the conventional technology, there occurs a problem of information leakage. For example, documents of a firm to be circulated in its divisions are directly sent to external organizations.

(2) When the communication route has a small transmission capacity, the workflow or circulation is delayed.

In the prior art, all information is transmitted. Therefore, when a large amount of information is transmitted through a wide area network (WAN) and/or an external network having a low transmission capacity, there arises a problem that the transmission time is elongated and/or there occurs a communication failure.

(3) Transmission of cancellation of a transmitted workflow case is not appropriately guaranteed.

For the cancellation, an electronic mail indicating cancellation is sent to a workflow management system of the associated destination in the prior art. However, there exists a problem that whether or not the canceling information is delivered before the transmitted workflow case is processed is not ensured.

(4) The processing status of the associated destination system is not easily determined.

In the conventional technology, a query mail or enquiry mail is sent to a workflow management system of the associated destination for inquiring the processing status of the workflow case. However, there is a problem that the status is determined only when an answer is received in response to the query from the partner.

SUMMARY OF THE INVENTION

It is therefore an object of the present invention, which removes the problems mentioned above, to provide an interoperable workflow management system and method with a high security capability, capable of controlling delivered information in accordance with destinations in information circulation, and a computer-readable recording medium storing a program for implementing the workflow management.

Another object of the present invention is to provide an interoperable workflow management system and method in which even when canceling information of a transmitted workflow case is not received by the destination upon a cancel operation by the transmitting source, it is guaranteed that the case is canceled by the destination.

Still another object of the present invention is to provide an interoperable workflow management system and method in which the transmitting source or partner can recognize without any query the current status of the workflow case and the status of processing thereof in the workflow case destination.

To achieve the above objects, in accordance with an aspect of the present invention, there is provided an interoperable workflow management system in which two or more workflow management systems are associated with each other. At least one of the systems includes transmitting information control means for selecting transmitting information in accordance with a disclosure level of the partner system as the destination of transmission and transmitting the selected information thereto. In consequence, the communication can be performed, for example, as follows. When the transmitting and receiving systems are of the same system configuration, the entire information of the workflow case is transmitted. Otherwise, only partial information of the workflow case is transmitted. With the above configuration, the information disclosing range or limitation can be controlled.

In accordance with another aspect of the present invention, there is provided an interoperable workflow management system in which two or more workflow management systems are associated with each other. At least one of the systems (one transmitting system) includes transmitting information control means for transmitting workflow control data related to the workflow control and pointer information indicating workflow user data not related to the workflow control to the workflow management system as the destination of transmission. The destination system includes workflow user data acquiring means for indicating pointer information to the system having transmitted the pointer information and thereby acquiring workflow user data indicated by the pointer information.

In the interoperable workflow management system above, the transmitting system transmits pointer information of workflow user data in place of the irrelevant data. When necessary, the destination system issues a request with pointer data. In response thereto, the transmitting system transmits the workflow user data. If unnecessary, the request is not issued and hence the transmitting system is not required to transmit the workflow user data. Resultantly, the amount of transmitted information is lowered and saved and the transmission delay is prevented even when the communication path has a small transmission capacity.

In accordance with another aspect of the present invention, there is provided an interoperable workflow management system in which two or more workflow management system in which two or more workflow management systems are associated with each other. At least one of the systems includes transmitting information control means which transmits only workflow control data related to the workflow control for the workflow cases to the workflow management system as the destination of transmission and which does not transmit workflow user data not related to the workflow control to the system as the destination, and submitting information control means for adding the workflow user data not transmitted to a response from the destination system to create a case of the destination and then submit the created case. In the interoperable workflow management system configured as above, since the transmitting system does not send workflow user data, the amount of transmitted information is decreased and the transmission is not delayed even if the communication route has a small transmission capacity. In addition, since the workflow user data is added again to the answer from the destination system, the transmitting system can restore the entire information of the case.

In accordance with another aspect of the present invention, there is provided an interoperable workflow.

In accordance with another aspect of the present invention, there is provided an interoperable workflow management system in which two or more workflow management systems are associated with each other. At least one of the systems includes transmitting information control means for transmitting workflow control data related to the workflow control and pointer data or information indicating workflow user data not related to the workflow control to the workflow management system as the destination of transmission, and canceling data replacing means for replacing, in response to indication of cancellation of a workflow case, the workflow user data with canceling data. The workflow management system as the destination of transmission includes workflow user data/canceling data acquiring means for indicating pointer information to the system having transmitted the pointer information to thereby acquire workflow user data or canceling data indicated by the pointer data.

In the interoperable workflow management system of this aspect, the transmitting system transmits pointer information of irrelevant data in place of the irrelevant data. When necessary, the transmitting system transmits the workflow user data in response to a query or request with pointer information issued from the destination system. If unnecessary, the request is not issued and hence it is not required for the transmitting system to transmit the workflow user data. Consequently, the amount of transmitted information is reduced and the transmission delay is prevented even when the communication path has a small transmission capacity.

Moreover, for the cancellation of the workflow case, the workflow user data is replaced with canceling data. This is internal processing of the transmitting system and hence can be executed at a high speed. Consequently, even when the canceling data is received after the processing is started in the destination system, the data obtained in response to a request is canceling data, not workflow user data. The cancellation can be therefore much more guaranteed.

In accordance with a further aspect of the present invention, there is provided an interoperable workflow management system in which two or more workflow management systems are associated with each other. At least one of the systems includes transmitting information control means for transmitting workflow control data related to the workflow control and pointer information indicating workflow user data not related to the workflow control to the workflow management system as the destination of transmission and status determining means for determining, when an access indicating pointer data is received from the destination system, a status that the workflow case is in process. The destination system includes workflow user data acquiring means for indicating pointer information to the system having transmitted the pointer information and thereby acquiring workflow user data indicated by the pointer data.

In the interoperable workflow management system above, the transmitting system transmits pointer data of workflow user data in place of the irrelevant data. If necessary, the destination system issues a request with pointer data for the workflow user data. In response thereto, the transmitting system sends the workflow user data. If unnecessary, the request is not issued and hence the transmitting system is not required to send the workflow user data. Therefore, the amount of transmitted information is minimized and the data transmission is not delayed even when the communication route has a small transmission capacity. Additionally, when a request for workflow user data is received from the destination system, it is assumed that the processing of the case is already initiated. Due to this provision, the processing status in the destination system can be immediately determined.

Other objects, features and advantages of the present invention will become apparent when reading the following description of the embodiments of the invention taken in conjunction with the accompanying drawings.

DESCRIPTION OF THE PREFERRED EMBODIMENTS

Referring now to the accompanying drawings, description will be given of embodiments of the present invention. In this regard, however, the present invention is not restricted by the embodiments.

Figure 1:
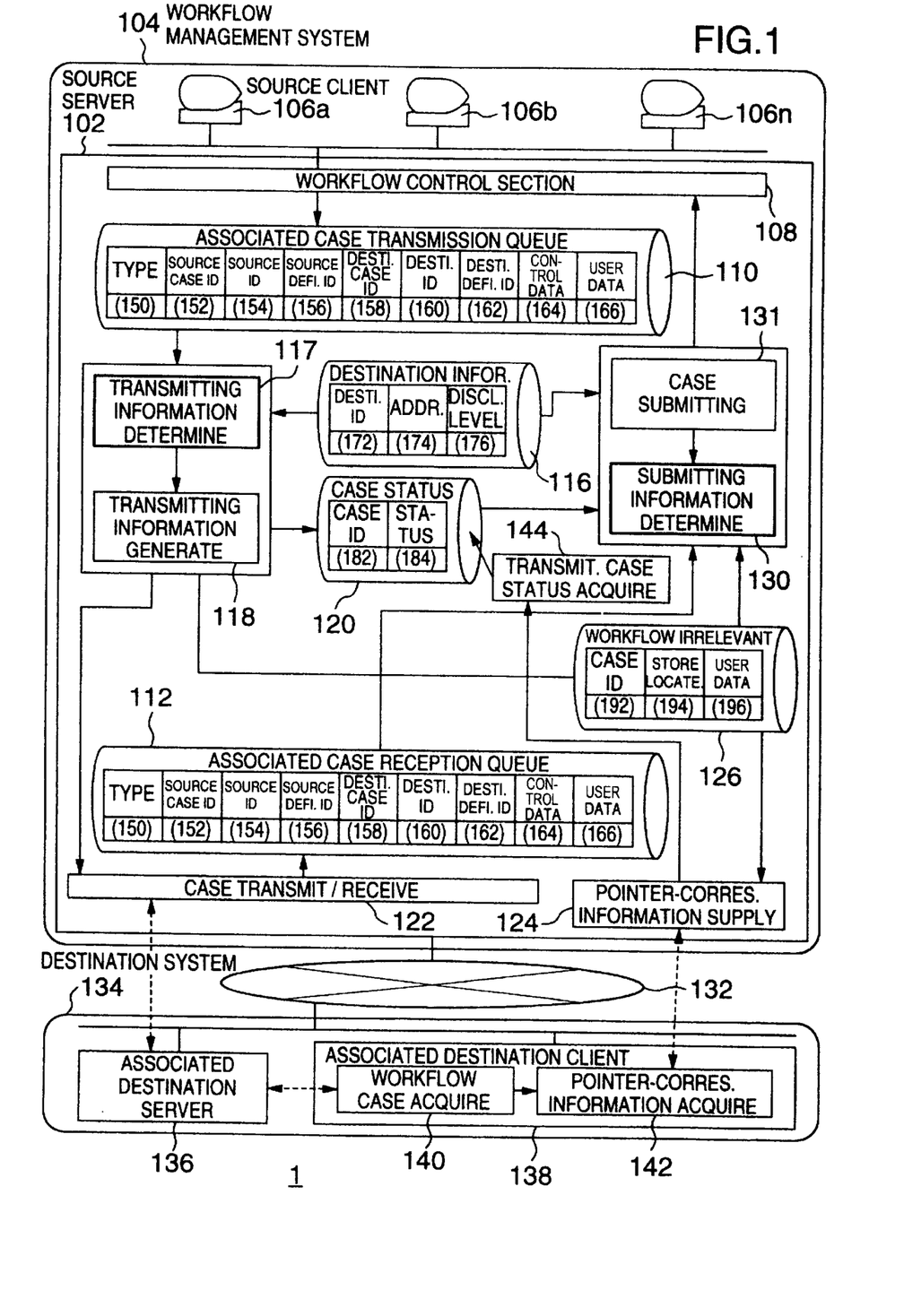
FIG. 1 is a diagram schematically showing a configuration of an interoperable workflow management system in accordance with an embodiment of the present invention.

FIG. 1 shows in a block diagram a configuration of the interoperable workflow management system in accordance with an embodiment of the present invention.

The system 1 includes a workflow management system 104, a network 132, and at least one workflow management system 134 as an associated destination.

The system 104 includes a workflow server 102 and clients 106a to 106n which conduct such operations as submission (creation), retrieval, and cancellation of workflow cases for the server 102.

Similarly, the system 134 includes an associated destination workflow server 136 and includes an associated destination client 138.

The server 102 includes a workflow control section 108 for controlling a workflow or circulation of a workflow case in accordance with a workflow definition. When a subsequent workflow destination is a client in the system 104, the circulation is conducted in a similar manner as for the prior art. On the other hand, when the subsequent workflow destination is an associated destination client in the system 134, data corresponding to the workflow case is stored or queued in an associated case transmission queue 110.

The queue 110 includes data items corresponding to workflow cases as follows.

Type of processing 150: "Transmission" or "cancellation".
Source ID 152: Identifier of a workflow case in the system 104.
Associated source ID 154: Identifier indicating the system 104.
Source workflow defining ID 156: Identifier of definition of a workflow of a workflow case in the system 104.
Destination ID 158: Identifier of a workflow case in the system 134.
Associated destination ID 160: Identifier indicating the system 134.
Destination workflow defining ID 162: Identifier of definition of a workflow of a workflow case in the system 134.
Workflow control data 164: Information for the workflow control section 108 to control the workflow route.
Workflow user data 166: Information for the user to set the workflow control data 164, not used to directly control the workflow route.

Set to an associated destination information table 116 are an associated destination ID 172 which is an identifier of the system 134, an address of the system 134, and a disclosure level 176 stipulating a level to disclose information to a partner.

A transmitting information or data determining unit 117 acquires a workflow case from the queue 110, selectively determines the contents of the queue 110 by referring to the table 116 to determine that the case is associated with transmitting information. For example, if necessary, the unit 117 registers to a workflow user data management table 126 workflow user data not transmitted. The provision of the transmitting data determining unit 117 is an aspect of the present invention. Thanks to the provision, whether or not workflow user data is to be sent to the system 134 can be controlled.

A transmitting information generating unit 118 generates transmitting data or information in accordance with transmission information determined by the unit 117, transfers the generated information to a case transmitting and receiving unit 122, and updates a case status table 120.

The table 120 includes a case ID 182 for storing therein an identifier of a workflow case in the system 134 and a status item 184 for storing therein a status of the case ("transmitted", "in process", or "canceled").

The unit 122 transmits the transmitting information via the network 132 to the workflow server 136 of the system 134.

Additionally, the unit 122 receives a workflow case from the server 136 of the system 134 and stores data corresponding to the case in an associated case reception queue 112.

Data queued in the queue 112 is similar to the data stored in the transmission queue 110 above.

A submitting information determining unit 130 acquires a workflow case from the queue 112 and then determines submitting information by referring to the tables 120, 126, and 116. Provision of the determining unit 130 is an aspect of the present invention. Due to the unit 130, workflow irrelevant information not sent to the system 134 can be restored.

A case submitting unit 131 generates submitting information in accordance with determination of the determining unit 130 and then passes the generated information to the workflow controller 108.

The controller 108 submits the generated information to the client 106 of the system 104.

A pointer-corresponding information supplying unit 124 controls operation to refer to data indicated by pointer information, namely, workflow user data. That is, the client 138 passes pointer information via the network 132 to the information supplying unit 124 to thereby refer to data indicated by the pointer information. It is also possible to set a password to enable the operation to refer to data indicated by the pointer information. Moreover, when an access is executed to the unit 124 via the network 132, the unit 124 invokes a transmitted case status acquiring unit 144.

If a workflow case corresponding to the accessed data has already been registered to the status table 120, the unit 144 updates the status 184 from "transmitted" to "in process" in the table 120. The provision of the acquiring unit 144 is one aspect of the present invention. As a result, the acquiring unit 144 can determine that the workflow case is being processed in the client 138, without any delay.

Figure 2:
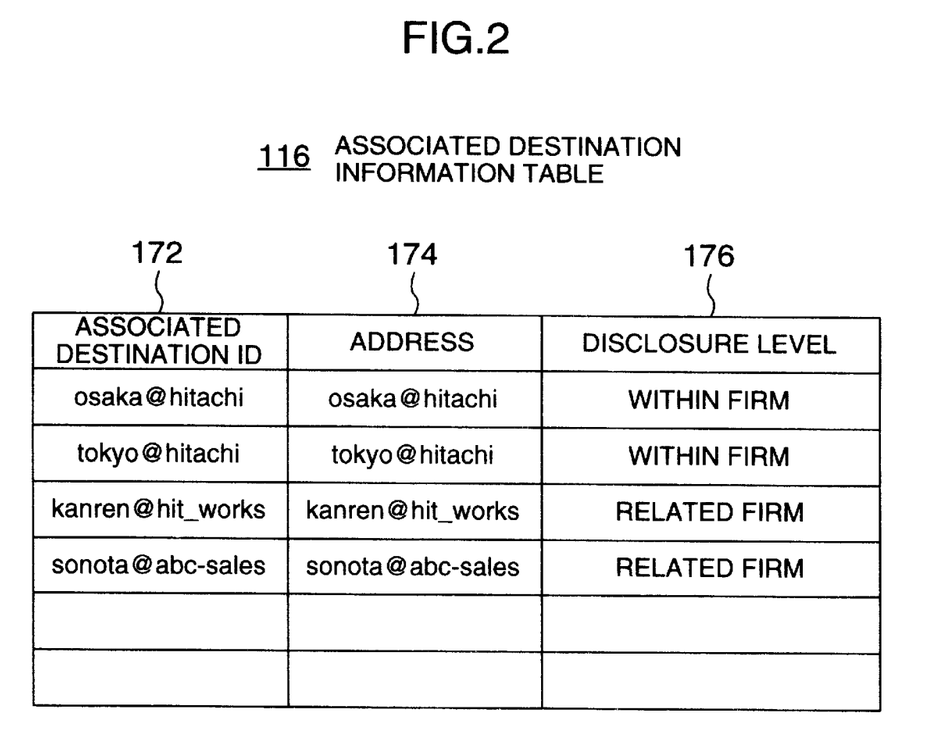
FIG. 2 is a diagram illustratively showing an associated destination information table.

FIG. 2 shows an example of the associated destination information table 116.

The value of disclosure level 176 is set to, for example, "within firm" or "related firm" indicating a transaction or business type. As to the extent or scope of the disclosure, generally, the level "within firm" is larger than "related firm", and the level "internal network" is greater than "external network". However, various disclosure levels may be set in accordance with an information management policy.

Figure 3:
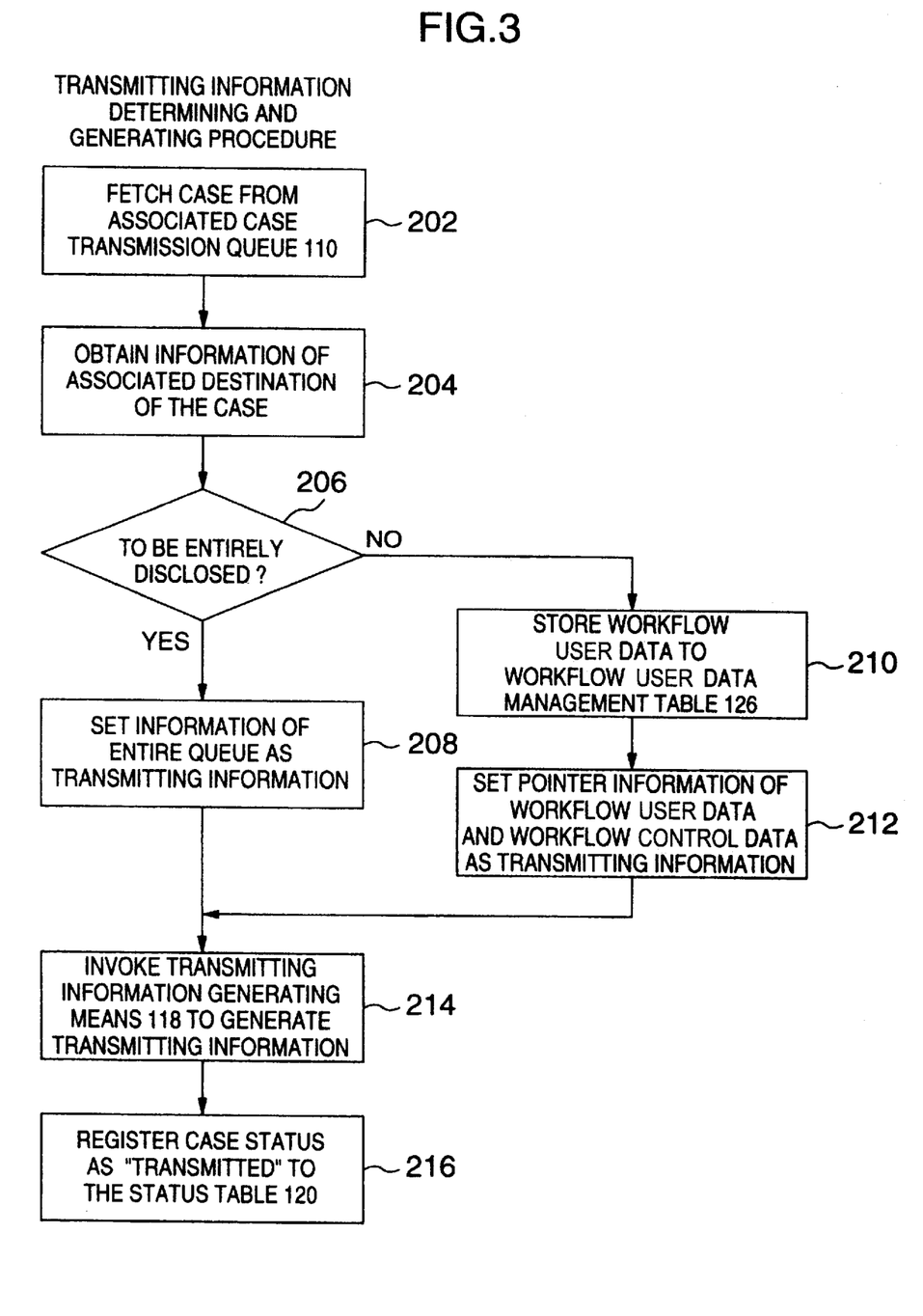
FIG. 3 is a flowchart showing operation of a transmitting information determining unit and a transmitting information generating unit to transmit a workflow case.

FIG. 3 shows a flowchart of operation of the transmitting information determining and generating units 117 and 118 to transmit a workflow case.

In step 202, the unit 117 fetches from the queue 110 a workflow case of which the type 150 is set to "transmission", where actually, step 204 and subsequent steps are executed when the type 150 of the fetched case is "transmission".

In step 204, the unit 117 makes a retrieval through the table 116 as shown in FIG. 2 by setting the value of the associated destination 160 as a retrieval key for the associated ID 172 to thereby acquire values respectively of the address 174 and the disclosure level 176 for the associated destination.

In step 206, the unit 117 determines depending on the value of the disclosure level 176, i.e., the business type for the destination whether or not the contents of the case are entirely disclosed. If this is the case, control is passed to step 208; otherwise, control is passed to step 210. For example, it is assumed that the case is entirely disclosed when the value of the disclosure level 176 indicates "within firm" and the case is partially disclosed when the value designates "related firm".

In step 208, the unit 117 determines that the workflow control data 164 and the workflow user data 166 are set as transmitting information. Thereafter, control is transferred to step 214.

In step 210, the unit 117 stores the irrelevant data 166 in the workflow user data management table 126.

In step 212, the unit 117 determines that the workflow control data 164 and pointer information indicating a storage location of the workflow user data 166 are set as transmitting information.

In step 214, the transmitting information generating unit 118 generates transmission information in accordance with determination of the determining unit 117. The generated information is sent via the case transmitting and receiving unit 122 to the destination.

In step 216, the unit 118 registers in accordance with the transmission of the information above an identifier of the workflow case to the case ID 182 and "transmitted" to the status 184 in the table 120.

As above, the information disclosing range of the workflow case is determined in accordance with the value of the disclosure level 176 in the table 116 and hence can be controlled by changing the value of the disclosure level 176.

Incidentally, it may also be possible to use as the disclosure level 176 such information as "internal network" like a local area network (LAN) or "external network" like a WAN. Moreover, if necessary, the disclosure level 176 may include three or more levels.

Figure 4:
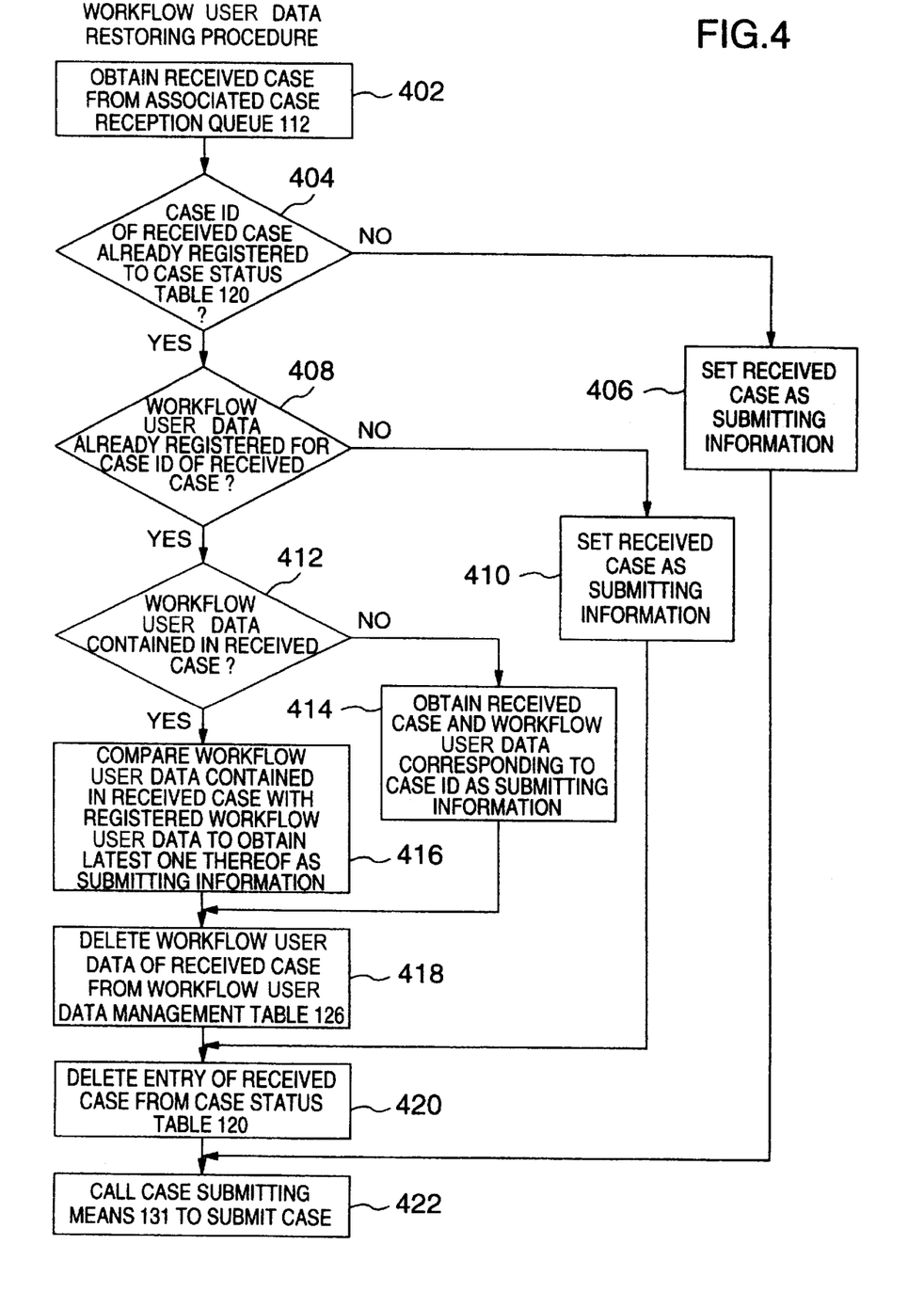
FIG. 4 is a flowchart showing operation of a submitting information determining unit.

FIG. 4 shows in flowchart the operation of the submitting information determining unit 130.

In step 402, the unit 130 receives a workflow case from the reception queue 112.

In step 404, the unit 130 determines whether or not the identifier of the attained case has been registered to the case ID in the case status table 120. If the identifier is missing, control is passed to step 406; otherwise, control is transferred to step 408.

In step 406, since the case is a new workflow case, the unit 130 regards the case as submitting information and then passes control to step 422.

In step 408, the unit 130 determines whether or not the identifier of the attained case has been registered to the case ID in the management table 126. If the identifier is missing, control is passed to step 410; otherwise, control is transferred to step 412.

In step 410, the unit 130 regards the case as submitting information and then transfers control to step 420.

In step 412, the unit 130 determines whether or not the case includes workflow user data. If the data is missing, control is passed to step 414; otherwise, control is transferred to step 416.

In step 414, the unit 130 obtains workflow user data 196 corresponding to the case from the management table 126 and adds the data to the case to thereby create submitting information. Thereafter, control is passed to step 418.

In step 416, the unit 130 obtains workflow user data 196 corresponding to the case from the management table 126, compares the data with that included in the. case to select the latest one therefrom, and then adds the selected data to the case to thereby create submitting information. Thereafter, control is passed to step 418.

In step 418, the unit 130 deletes the irrelevant data 196 of the case from the management table 126.

In step 420, the unit 130 deletes an entry of the case from the status table 120.

In step 422, the unit 130 invokes the case submitting unit 131 to submit the submitting information.

As above, for a workflow case of which the workflow user data has not been transmitted to the associated partner, the workflow user data can be restored when the case is processed and is returned from the associated partner.

Figure 5:
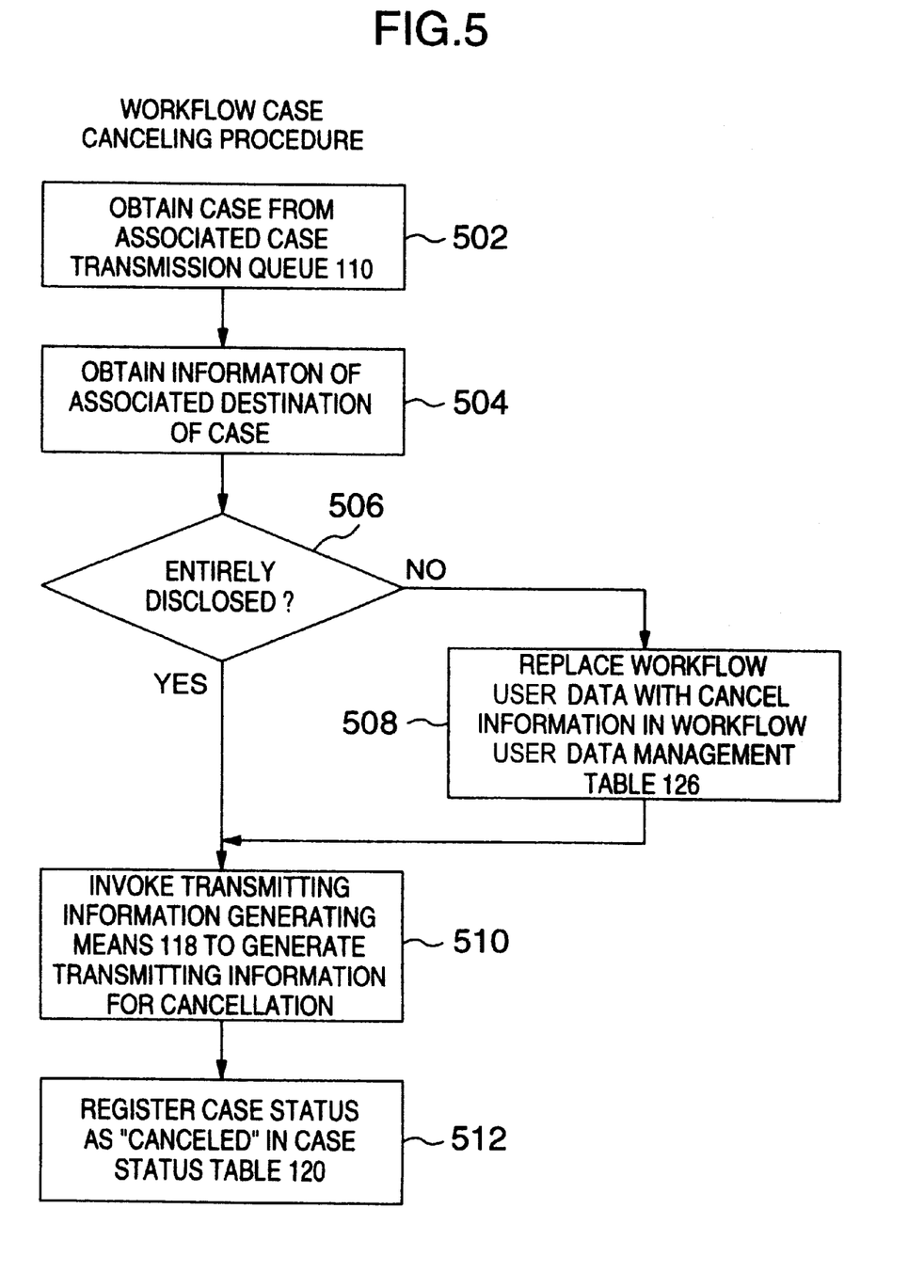
FIG. 5 is a flowchart showing operation of a transmitting information determining unit and a transmitting information generating unit to cancel a transmitted workflow case.

FIG. 5 shows in flowchart the operation of the transmitting information determining and generating units 117 and 118 to cancel a transmitted workflow case.

In step 502, the unit 117 acquires from the transmission queue 110 a workflow case of which the type 150 indicates "cancellation" where actually, step 504 and subsequent steps are executed when the type 150 of the acquired case is "cancellation".

In step 504, the unit 117 conducts a retrieval through the table 116 by setting the value of the associated destination or partner 160 of the transmission queue 110 as a retrieval key to obtain an associated destination 172 so as to obtain values respectively of the address 174 and the disclosure level 176.

In step 506, the unit 117 determines depending on the value of the disclosure level 176 whether or not the case has been entirely disclosed. If this is the case, control is passed to step 510; otherwise, control is transferred to step 508.

In step 508, the unit 117 replace the irrelevant data 196 of the table 126 corresponding to the case with canceling information or data.

In step 510, the unit 118 generates transmitting information for cancellation.

In step 512, the unit 118 replaces the status 184 of the table 120 corresponding to the case with "cancelled".

Figure 6:
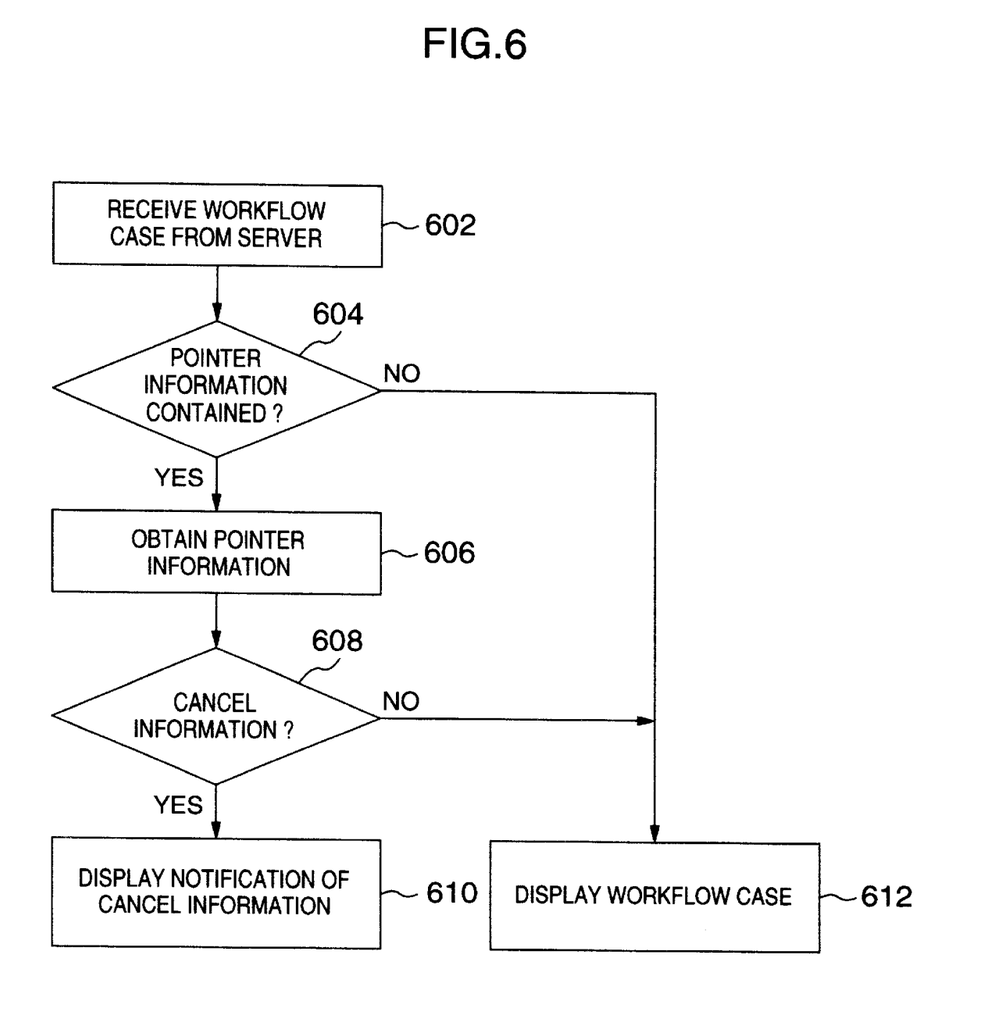
FIG. 6 is a flowchart showing operation of an associated destination client to process a workflow case.

FIG. 6 shows a flowchart of operation of the client 138 to process a workflow case.

In step 602, the client 138 receives a workflow case from the server 136.

In step 604, the client 138 determines whether or not the obtained case includes pointer information. If this is the case, control is passed to step 606; otherwise, control is transferred to step 612.

In step 606, using a pointer corresponding information acquiring unit 142, the client 136 accesses the pointer corresponding information supplying unit 124 via the network 132 to acquire information indicated by the pointer information. That is, the client 136 obtains workflow user data 196 of the table 126 corresponding to the case.

In step 608, the client 136 determines whether or not the obtained information, i.e., the irrelevant data 196 of the table 126 is canceling information. If this is the case, control is passed to step 610; otherwise, control is transferred to step 612.

In step 610, the client 136 displays that the case is associated with cancellation.

In step 612, the client 136 directly displays the attained workflow case.

As described above, when canceling a workflow case sent from the system 104 to the associated system 134, the system 104 can immediately erase the workflow user data 196 of the table 126, namely, the system 104 replaces the data 196 with canceling information or data. Moreover, the associated system 134 can immediately recognize the event of cancellation even before the transmitting information for cancellation is received.

In the embodiment mentioned above, the steps in the respective operation flowcharts may be stored in the form of a program on recording media such as a compact disk read-only memory (CD-ROM) or a digital video disk read-only memory (DVD-ROM). By installing the program in the hardware of the workflow management system, the interoperable workflow management system can be implemented. The program can be installed in the workflow management system from another server in place of the recording media.

In this connection, a pending U.S. application Ser. No. 08/546,912 field on Oct. 23, 1995 and assigned to the assignee of the present application discloses a technology related to the interoperable workflow management system. The disclosure thereof is incorporated herein by reference.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A workflow management system interoperable with other workflow management systems, comprising:

store means for storing therein disclosure levels of workflow information for each of the other workflow management systems associated with said workflow management system as a source, the disclosure level of information being determined depending on said each of the other workflow management systems;

means for inputting a workflow case to be processed;

means for specifying as a destination, another workflow management systems to be associated with said source workflow management system with respect to the workflow case inputted to said input means;

means for determining a disclosure level of information to said specified another workflow management system, using the disclosure level stored in said store means; and means for sending information for processing said workflow case to said specified another workflow management system, such that the sent information may be disclosed in said specified another workflow management system at the disclosure level determined by said determining means, wherein said store means stores as the disclosure level, an association level indicating an association between said workflow management system and said workflow management system interoperable therewith, wherein said store means stores a value of said disclosure level as "within firm" and said sending means sends said information for processing the workflow case in accordance with said "within firm" disclosure level, wherein said store means stores a value of said disclosure level as "related firm", and said sending means sends said information for processing the workflow case in accordance with said "related firm" disclosure level, wherein said workflow case sent by said sending means includes workflow control data related with workflow control and a pointer to the source system for stored workflow user data not related with the workflow control, and wherein said destination workflow management system uses the pointer to the source system to obtain information from the source system for use with the workflow case.

2. A workflow management system interoperable with other workflow management systems according to claim 1, wherein said disclosure level stored by said store means is associated with a connection using an internal network.

3. A workflow management system interoperable with other workflow management systems according to claim 2, wherein said internal network is associated with a local area network (LAN).

4. A workflow management system interoperable with other workflow management systems according to claim 1, wherein said disclosure level stored by said store means is associated with a connection using an external network.

5. A workflow management system interoperable with other workflow management systems according to claim 4, wherein said external network is associated with a wide area network (WAN).

* * * * *